United States Patent
Kotler et al.

(10) Patent No.: US 8,375,320 B2
(45) Date of Patent: Feb. 12, 2013

(54) CONTEXT-BASED TASK GENERATION

(75) Inventors: Matthew J. Kotler, Sammamish, WA (US); Ned B. Friend, Seattle, WA (US); Erez Kikin-Gil, Redmond, WA (US); Charles W. Park, Sammamish, WA (US); Jesse Clay Satterfield, Seattle, WA (US); Igor Zaika, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 12/820,914

(22) Filed: Jun. 22, 2010

(65) Prior Publication Data

US 2011/0314404 A1    Dec. 22, 2011

(51) Int. Cl.
*G06F 3/048* (2006.01)
*G06F 15/16* (2006.01)

(52) U.S. Cl. ........ 715/772; 715/205; 715/234; 715/764; 709/206; 709/223

(58) Field of Classification Search .......... 715/200, 715/201, 202, 205–208, 234, 253, 255, 273, 715/276, 277, 700, 731, 732, 737, 738, 740, 715/750, 760, 762, 763, 808, 809, 816, 817, 715/828, 854, 860, 861, 204, 209, 210, 226, 715/254, 256, 739, 776, 813, 853; 709/201, 709/202, 203, 204, 206, 207, 212, 216, 217, 709/218, 219, 223, 224, 225
See application file for complete search history.

(56) References Cited

U.S. PATENT DOCUMENTS

| | | | |
|---|---|---|---|
| 6,047,260 A | 4/2000 | Levinson | |
| 6,177,905 B1 * | 1/2001 | Welch | 342/357.75 |
| 6,680,675 B1 | 1/2004 | Suzuki | |
| 6,769,120 B1 | 7/2004 | Rodriguez | |
| 6,925,603 B1 | 8/2005 | Naito et al. | |
| 7,103,559 B2 | 9/2006 | Worthington | |
| 7,565,340 B2 | 7/2009 | Herlocker et al. | |
| 7,610,365 B1 | 10/2009 | Kraft et al. | |
| 7,797,267 B2 * | 9/2010 | Horvitz | 706/46 |
| 7,818,197 B2 | 10/2010 | Cho et al. | |
| 7,975,239 B2 * | 7/2011 | Bellotti et al. | 715/825 |
| 8,108,206 B2 | 1/2012 | Hufnagel et al. | |

(Continued)

FOREIGN PATENT DOCUMENTS

| KR | 10-2007-0070374 | 7/2007 |
|---|---|---|
| KR | 10-2007-0111590 | 11/2007 |

(Continued)

OTHER PUBLICATIONS

Kaushik, Pallavi, et al. "Observations From a Case Study on User Adaptive Reminders for Medication Adherence", Published 2008, http://ieeexplore.ieee.org/stamp/stamp.jsp?tp=&arnumber=4571082&userType=inst, 4 pages.

(Continued)

*Primary Examiner* — Maikhanh Nguyen
(74) *Attorney, Agent, or Firm* — Merchant & Gould

(57) ABSTRACT

A triggering mechanism for generating task reminders based on contextual information associated with the tasks is provided. Contextual information may be extracted from a variety of sources and may be related to one or more tasks. Based on the contextual information, task reminders may be generated and may be presented in a manner that makes the task reminders more useful to an end user.

18 Claims, 10 Drawing Sheets

U.S. PATENT DOCUMENTS

| | | | |
|---|---|---|---|
| 2002/0054130 A1* | 5/2002 | Abbott et al. | 345/783 |
| 2002/0194246 A1 | 12/2002 | Moskowitz et al. | |
| 2005/0091578 A1 | 4/2005 | Madan et al. | |
| 2005/0108074 A1 | 5/2005 | Bloechl et al. | |
| 2005/0138631 A1* | 6/2005 | Bellotti et al. | 719/310 |
| 2005/0256754 A1 | 11/2005 | Nastacio | |
| 2006/0069604 A1 | 3/2006 | Leukart et al. | |
| 2006/0074844 A1 | 4/2006 | Frankel et al. | |
| 2006/0106854 A1 | 5/2006 | Haigh et al. | 707/102 |
| 2006/0136280 A1 | 6/2006 | Cho et al. | |
| 2006/0184880 A1 | 8/2006 | Bala | |
| 2006/0225076 A1* | 10/2006 | Longobardi | 718/102 |
| 2006/0239248 A1 | 10/2006 | Hawk et al. | |
| 2006/0242586 A1 | 10/2006 | McGlinchey et al. | |
| 2006/0259511 A1 | 11/2006 | Boerries et al. | |
| 2006/0265294 A1 | 11/2006 | De Sylva | |
| 2007/0073810 A1 | 3/2007 | Adams et al. | |
| 2007/0106931 A1* | 5/2007 | Vartiainen et al. | 715/512 |
| 2007/0130186 A1 | 6/2007 | Ramsey et al. | |
| 2007/0130369 A1 | 6/2007 | Nayak | |
| 2007/0143376 A1 | 6/2007 | McIntosh | |
| 2007/0162907 A1 | 7/2007 | Herlocker et al. | |
| 2007/0188319 A1* | 8/2007 | Upton | 340/539.13 |
| 2007/0282658 A1 | 12/2007 | Brintle | |
| 2007/0288279 A1 | 12/2007 | Haugen et al. | |
| 2008/0005055 A1 | 1/2008 | Horvitz | 706/62 |
| 2008/0046862 A1 | 2/2008 | Sattler et al. | |
| 2008/0076400 A1 | 3/2008 | Moosavi et al. | |
| 2008/0082651 A1 | 4/2008 | Singh et al. | |
| 2008/0091782 A1 | 4/2008 | Jakobson | |
| 2008/0162160 A1 | 7/2008 | Singh et al. | 705/1 |
| 2008/0175104 A1 | 7/2008 | Grieb et al. | |
| 2008/0263165 A1 | 10/2008 | Hui et al. | 709/206 |
| 2008/0281901 A1 | 11/2008 | Lusher et al. | |
| 2009/0013250 A1* | 1/2009 | Hsieh et al. | 715/273 |
| 2009/0102676 A1 | 4/2009 | Hoffmann et al. | 340/686.6 |
| 2009/0125332 A1 | 5/2009 | Martin | 705/3 |
| 2009/0157617 A1 | 6/2009 | Herlocker et al. | |
| 2009/0193415 A1 | 7/2009 | Narayanaswami et al. | |
| 2009/0287718 A1 | 11/2009 | Motoyama et al. | |
| 2009/0287731 A1 | 11/2009 | Motoyama et al. | |
| 2009/0319608 A1 | 12/2009 | Anil et al. | |
| 2009/0320025 A1 | 12/2009 | Ferguson et al. | |
| 2010/0004921 A1 | 1/2010 | Hufnagel et al. | |

FOREIGN PATENT DOCUMENTS

| | | |
|---|---|---|
| WO | 0113069 A1 | 1/2001 |
| WO | 03107129 A2 | 12/2003 |

OTHER PUBLICATIONS

Dey, Anind K., et al. "CybreMinder: A Context-Aware System for Supporting Reminders", © Springer-Verlag Berlin Heidelberg 2000, http://smarthome.cs.cmu.edu/classes/smarthome/pubs/dey_cybreminder.pdf, 15 pages.

Hakkila, Jonna, et al. "User Experiences on Combining Location Sensitive Mobile Phone Applications and Multimedia Messaging", *MUM 2004*, Oct. 27-29, 2004, Collage Park, Maryland, USA. Copyright 2004 ACM 1-58113-981-0/04/10, http://delivery.acm.org/10.1145/1060000/1052405/p179-hakkila.pdf?key1=1052405&key2=8821296621&coll=GUIDE&dl=GUIDE&CFID=79077885&CFTOKEN=59694247, 7 pages.

Mistry, Pranav, et al. "Augmenting Sticky Notes as an I/O Interface", MIT Media Laboratory, 20 Ames Street, Cambridge, MA 02139. Published Jul. 14, 2009, http://fluid.media.mit.edu/assets/_pubs/p2217_mistry.pdf, 10 pages.

Radi, Harald, et al. "Towards Alternative User Interfaces for Capturing and Managing Tasks with Mobile Devices", MoMM 2008, Nov. 24-26, 2008, Linz, Austria. http://www.mayrhofer.eu.org/downloads/ publications/MoMM2008-Towards-Mobile-Task-Management.pdf, 4 pages.

Smartcode, "Dynamic Notes 3.46", Published 2008, http://dynamic-notes.smartcode.com/info.html, 2 pages.

SnapFiles, "SmartToDo Personal Task Manager", Published Jan. 23, 2009, http://www.snapfiles.com/get/smarttodo.html, 3 pages.

Back, Maribeth, et al. Prototyping a tangible tool for design: Multimedia e-paper sticky notes, FX Palo Alto Laboratory, Palo Alto, California. Published 2009. http://www.fxpal.com/publications/FXPAL-PR-09-499.pdf, 12 pages.

Conley, K. et al. Towel: Towards an Intelligent To-Do List, IN: the AAAI Spring Symposium on Interaction Challenges for Artificial Assistants, 7 pgs., 2007.

Pauline M. Berry et al., A Personalized Calendar Assistant, http://ai.sri.com/~gervasio/pubs/berry-ss04.pdf, 6pgs, 2004.

Andrew Faulring et al., Visualizing and Manipulating Complex Calendar Scheduling Information, http://scholar.google.com/scholar?hl=en&lr=&q=cache:XQivLN8U0XkJ:www.cs.cmu.edu/~faulring/papers/cal-sched-dis06.pdf+tasks+calendar+organize+, 8pgs., 2006.

Victoria Bellotti et al., What a to-do: studies of task management towards the design of a personal task list manager, http://portal.acm.org/citation.cfm?id=985692.985785, 8pgs., Apr. 2004.

Kreifelts, Thomas et al., "Sharing To-Do Lists with a Distributed Task Manager", published in ECSCW '93, Proc. Third European Conference on Computer-Supported Cooperative Work on Sep. 15-17, 1993, Milano, Italy. Reprinted by permissions of Kluwer Academic Publishers, http://citeseerx.ist.psu.edu/viewdoc/download;iessionid=8058BDB7D6CD9F588E557272F2BB39C8?doi=10.1.1.38.2100&rep=rep1&type=pdf, 16 pages.

To-Do List Pro—Published Date: Jul. 23, 2010, http://appshopper.com/productivity/to-do-list-pro-time-tracker, 2 Pages.

* cited by examiner

CONTEXT-BASED TASK GENERATION

BACKGROUND

With the advent of computers and computer software, a number of advancements have been made to help people manage both their working and non-working lives. To help people who are trying to juggle numerous tasks at work, at home, and in between, electronic tasks and calendaring programs have been developed to assist with the often daunting task of maintaining, tracking and remembering all the things that must be accomplished on a daily basis. Unfortunately, most tasks systems are very one-dimensional in that task reminders generated by such systems occur at fixed times as programmed by a user and do not account for the user's operating context at the time of the reminder. For example, a user may have a task reminder in his/her electronic tasks application to pick up flowers at 5:30 p.m. because the user knows he/she is typically on the way home at that time. If the user has been delayed at work, he/she may receive the reminder during an extended meeting, and then when the user actually goes home, he/she may forget to pick up the flowers. In such cases, the user is often required to use some type of "snooze" feature to put the task reminder off to a later time, manually update the reminder timing, or jot down a handwritten reminder on a scrap of paper or other medium. For another example, a user may wish to be reminded to contact a colleague to discuss a certain work document the next time she opens the document, but the user is not sure exactly when she will get to the document next. Thus, she does not know when to enter a reminder into her tasks application. For yet another example, a first have a task to speak with a second person about a particular project, and the first person may wish to have a reminder of the task when he/she comes into proximity or communication with the second person.

It is with respect to these and other considerations that the present invention has been made.

SUMMARY

Embodiments of the present invention solve the above and other problems by providing a triggering mechanism for generating task reminders based on contextual information associated with the tasks. Contextual information may be extracted from a variety of sources and may be related to one or more tasks. Based on the contextual information, task reminders may be generated and may be presented in a manner that makes the task reminders more useful to an end user. For example, a task reminder to pick up flowers on the way home from work may be presented to the user when he/she is physically approaching the florist as opposed to at a prescribed programmed time.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
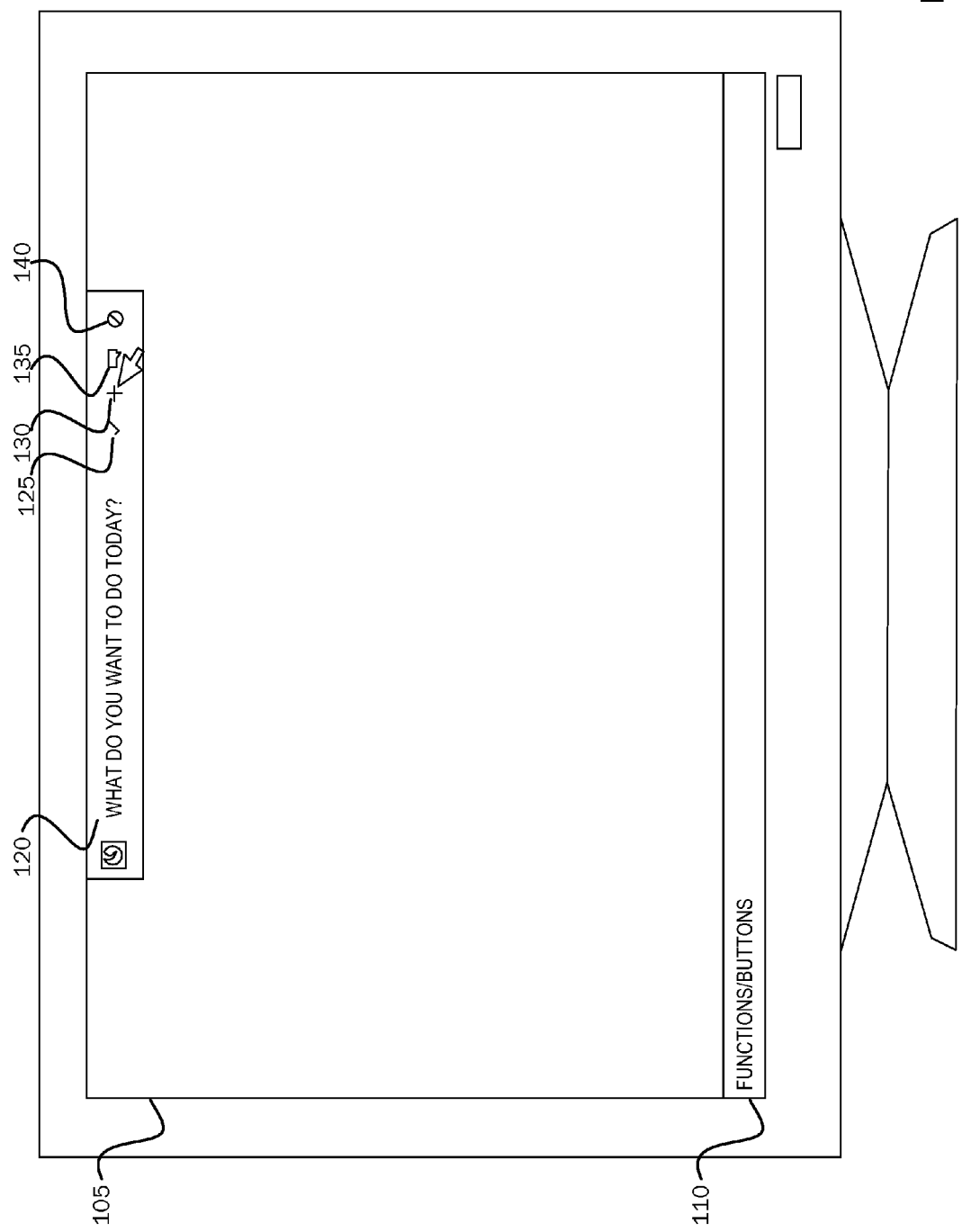
FIG. 1 is a simplified block diagram illustrating a list authoring surface user interface deployed on a display screen of a computer monitor.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to providing a triggering mechanism for generating task reminders based on contextual information associated with the tasks. Contextual information may be extracted from a variety of sources and may be related to one or more tasks. Based on the contextual information, task reminders may be generated and may be presented in a manner that makes the task reminders more useful to an end user.

FIG. 1 is a simplified block diagram illustrating the list authoring surface user interface deployed on a display screen of a computer monitor. The list authoring surface includes a lightweight user interface 120 (also referred to herein as a list user interface) that may be deployed across a number of software applications and that may be displayed on stationary and/or mobile computing device desktops or display areas.

For example, as illustrated in FIG. 1, the list authoring surface user interface (LASUI) is shown deployed on a display screen 105 of a stationary computer monitor. As should be appreciated, the display screen 105 may be illustrative of a display space associated with a computer operating system, or a display space associated with one or more software applications, for example, word processing applications, spreadsheet applications, slide presentation applications, notes applications, calendaring applications, contacts applications, and the like. A row of functions/buttons 110 is illustrated at the bottom edge of the display screen 105 for providing access to one or more functionalities associated with an example software application or operating system. As should be appreciated, the configuration and location of user interface components illustrated in FIG. 1 are for purposes of example only and are not limiting of other configurations that may be possible. That is, the LASUI 120 may be deployed along an upper edge of the display screen 105, as illustrated in FIG. 1, or the LASUI 120 may be deployed at other locations in the display screen as required by a user for effective utilization of the display screen.

According to embodiments, the list user interface 120 of the list authoring surface may be utilized as an electronic note, scrap of paper, note pad, "sticky" note, and the like that is associated with one or more software application displays for entering either manually or automatically list items, such as tasks, events, activities or other pieces of information, that a user might otherwise jot down on a piece of paper, note or other media for keeping in the forefront such information considered important to the user or for reminding the user. In addition to entering information into the user interface 120, the user interface 120 may be used for quick capture of information from opened documents and in association with opened applications so that the user does not have to leave a current application to launch a task entry user interface. Indeed, the list authoring surface UI 120 may be associated with a variety of electronic files, such as electronic documents, electronic mail items, contacts items, social networking information, and the like.

As illustrated in FIG. 1, one or more functionality buttons or controls 125, 130, 135, 140 may be provided in the list authoring surface UI 120 for editing or otherwise manipulating information contained in the UI 120. For example, a control 125 may be utilized for "checking off" completed tasks, a control 130 may be utilized for adding additional tasks, events or other information, a control 135 may be utilized for importing information or for annotating information to be stored or displayed in the user interface 120, and a variety of other controls 140 may be provided for other types of editing, sorting, filtering, searching, and the like information contained in the user interface 120.

According to an embodiment, one such control may be used to set the computer with which the list authoring surface is utilized to a "do not disturb" mode so no new email items, instant messaging (IM) items, or other distractions would come to the list authoring surface when the "do not disturb" mode is activated. Another such control 140 may allow a "snooze" mode to be applied to the task currently displayed so that a new task could be displayed instead and so that a user would not have to decide what to do with respect to the "snooze" task. That is, the user could hold the task by applying the "snooze" mode. In addition, the "snooze" mode may be used to filter out information not relevant to the current task only. For example, if a user applies the "snooze" mode to a task of "Plan morale event," and if the user's current task is "Redesign product," and the user gets an email from his/her supervisor about this project, the email about the task of "Redesign project" may be displayed, but emails about the "Plan morale event" task may not be displayed to the user.

Figure 2:
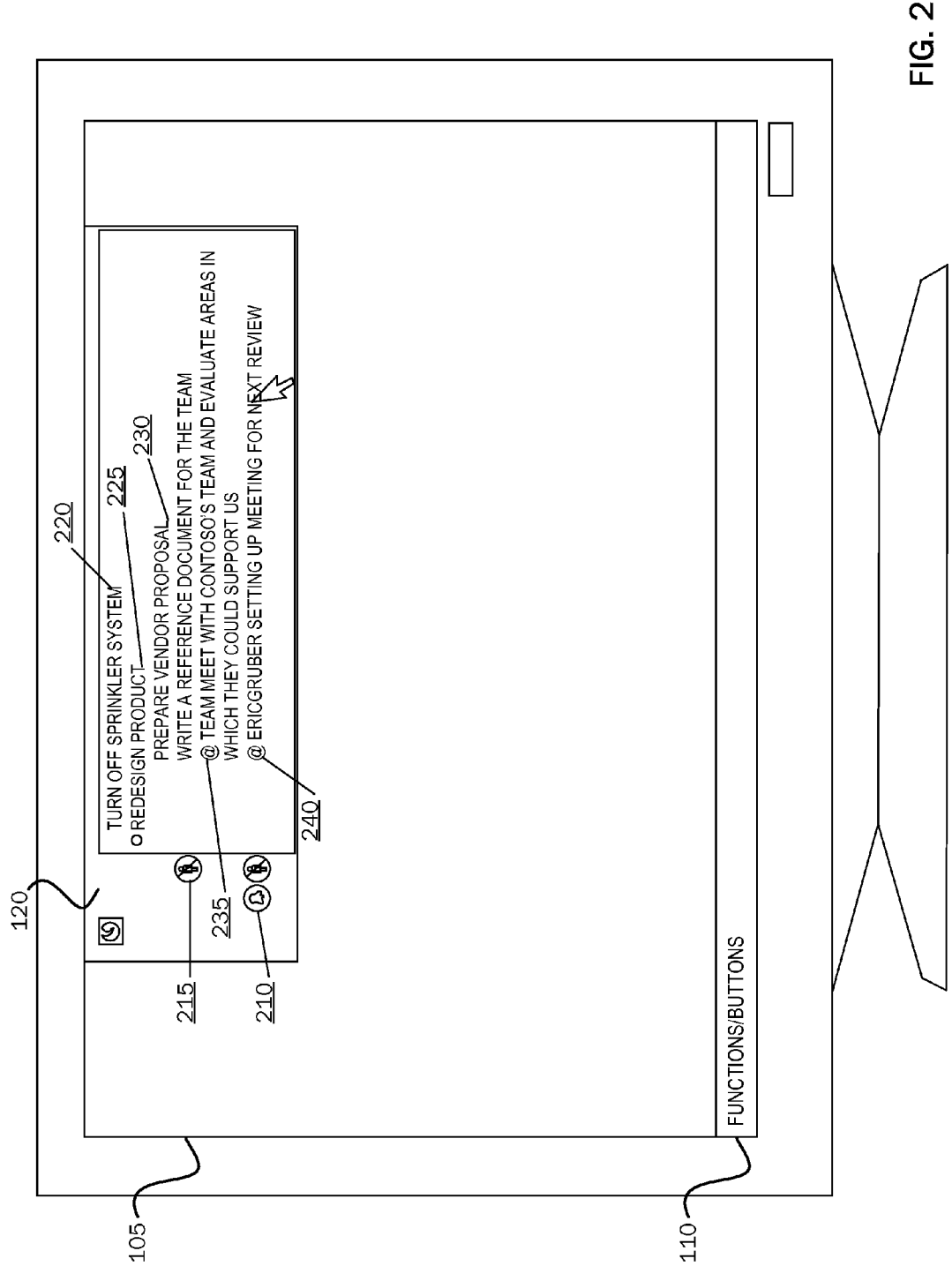
FIG. 2 is a simplified block diagram illustrating a list authoring surface user interface populated with one or more tasks, events, activities, or pieces of information deployed on a display screen of a computer monitor.

Referring now to FIG. 2, the list authoring surface user interface 120 is illustrated in an expanded form showing a variety of list items, for example, tasks, events, activities or other pieces of information, that have been entered either manually or automatically through information capture into the list authoring surface. For example, a first entry 220 of "Turn off sprinkler system" is illustrative of a task a user may enter into the list authoring surface user interface 120 to remind the user to handle this task when he returns home. For another example, a second entry 225 of "Redesign product" is illustrated having a number of subtasks 230 associated with the main task 225. Items displayed in the LAS UI 120 may be displayed according to one or more specified display arrangements, for example, based on designated time of performance, most recent on top, top 5 items as designated by a user, and the like. Such display arrangements may also apply to pivoted displays as described below with reference to FIG. 3.

Advantageously, entering and editing information into the list authoring surface UI 120 is easy and efficient. For example, information may be typed into the UI in a similar manner as entering a bulleted list of items in a word processing document. That is, the user may enter an item, select the "enter" key, "tab" key, or the like, and subsequent entries will be placed in the next row or sentence in the UI 120, but still have all of the benefits of any applied metadata. For example, the LAS UI may be formatted such that a simple carriage return or tab selection may create a hierarchy in entered list items that may be beneficial to the user. For example, the user may enter a first task of "Plan dinner party," followed by a carriage return or tab and then the entry of "Reserve restaurant," followed by another carriage return and the entry "Review menu offerings." By applying a hierarchical formatting to the entered items, the second two items may automatically be listed beneath and indented relative to the first item to create a displayed hierarchical relationship between the items.

According to embodiments, once data or other information is populated into the list authoring surface UI 120, metadata, for example, the phrase "@Team" 235, 240 may be entered into the LAS UI 120 as one or more text entries and may be applied to key words, key terms, key phrases, or other information components of a task list item to allow for structuring, editing, filtering, searching, sorting, or other automated manipulation of task list items (i.e., tasks, text or information) contained in the UI 120. Alternatively, metadata items may be selected from a menu of metadata items for application. For example, the metadata "@Team" may be applied to the task "Meet with Contoso's team and evaluate areas in which they could support us" to indicate that the example task is one of one or more tasks to be completed by a given team. In contrast, the metadata "@EricGruber" is applied to a task of "Setting up meeting for next review" to indicate that task is associated with a particular person.

Many other types of metadata may be applied to information in the list authoring surface UI 120. For example, while the example "@" symbol is used above to associate a task with a person or group, the "#" symbol may be used for tagging a task or other information with random metadata. For other examples, the "$" could be used to tag monetary information, the "&" symbol could be used to tag dates or time. As should be appreciated, any of a great number of such metadata types and symbols could be used, and the foregoing are for purposes of example only. Advantageously, such metadata items may be associated with information in the list authoring surface UI without entering another text or data entry field or without launching any other user interface component. As also should be appreciated, such metadata applied to various information in the list authoring surface UI 120 will allow for sorting, searching, filtering or otherwise manipulating the information contained in the UI 120. For example, using the metadata "@Team" may allow a sorting on all tasks, events, or other pieces of information to be performed by or that are associated with the team of personnel associated with the metadata "@Team."

In addition to using applied metadata to allow manipulation of information in the list authoring surface UI 120, applied metadata may also be used to add or manipulate data in other list authoring surface UIs of other users. For example, if a first user enters or captures a given piece of information in her list authoring surface UI, and then applies a metadata item such as "@Sarah" to the information, according to an embodiment, "Sarah" may now have the tagged information automatically populated into her list authoring surface UI so that she sees the tagged information as well.

As should be appreciated, an almost limitless amount and type of metadata may be applied to various pieces of information entered in the list authoring surface. For example, such metadata terms as date, time, location, name, address, telephone number, alphanumeric, audio, video and the like may be applied to one or more words, phrases, data, files, and the like for allowing future editing, sorting, searching, or manipulation of the information contained in the list authoring surface. For example, if a metadata type of "date" is applied to all dates contained in the list authoring surface UI 120, such metadata may be utilized for tagging dates contained in the UI 120 to allow a user to filter, sort, or search data contained in the UI 120 based on date. For example, a user may desire to sort all information contained in the UI 120 by date to allow the user to quickly see those tasks or events that are occurring or that should be performed today.

In addition to the application of metadata to one or more words, phrases or other pieces of information, natural language processing may be utilized for tagging and/or applying metadata to information contained in the list authoring surface. For example, if a phrase such as "Meet at Bob's Pizza Parlor at 6:00 p.m. on Friday" is entered into the list authoring surface user interface 120 a natural language processor may be applied to the phrase to parse the words to determine whether any of the words are associated with a particular information or data type. For example, each word or combination of the words in the example task item may be parsed to determine whether any particular information type is involved. For example, the words "Bob's Pizza Parlor" may be tagged as a name of a business, the time "6:00 p.m." may be tagged as a time, and the day "Friday" may be tagged as a particular day. A natural language processor may parse such phrases into one or more words, and the one or more words may be used for searching dictionaries or stores of words for matching the parsed words with various known words such as restaurant names, times, days, and the like. Once the natural language processor identifies certain words or phrases as belonging to information types, those words or phrases may be tagged with metadata so that the words or phrases may be utilized for searching, sorting, filtering editing or otherwise manipulating the information, as described above.

In addition to such manipulation of listed information, allowing for acting on the listed information is equally important. For example, functionality buttons and controls may be exposed in the list authoring surface UI to allow actions on listed items. For example, the listing of a contact item, such as "Bob's Pizza Parlor" may cause the listing of a "call" button which when selected causes a telephone program to call the listed contact, or an "email," "text" or similar button which when selected may allow an email or text message to be sent to the contact, etc. As should be appreciated, many other types of action controls may be exposed for listed items. For example, a control for adding listed names and related information to a contacts folder may be exposed, and the like.

In addition to natural language processing, other methods for recognizing and utilizing particular pieces of information may be used. For example, other methods may include, parsing text or data and passing the parsed text or data to one or more recognizer modules. Still other methods may include use of data analytics to analyze all of the data on the server and show auto-complete or other information (e.g., everyone who enters "Christmas" also happens to tag it with "#holiday" and perhaps you the user would like to as well). In addition, search may be used, for example, entering "Bob's Pizza Parlor" would cause a detection/identification by doing a search and seeing that "Bob's Pizza Parlor" is actually a restaurant that has an associated URL such as www.bobspizzaparlor.com.

According to embodiments, in addition to metadata tags, other list item attributes, including other forms of metadata, may be applied to list items entered into the list authoring surface. For example, list item attributes, such as team attribute, person attribute, date attribute, time attribute, location attribute, name attribute, address attribute, telephone number attribute, alphanumeric attribute, audio attribute, video attribute, and the like may be applied to a given list item. As should be appreciated, the list item attributes may be extensible and customizable, for example, price attributes, location in a store of items on a purchase list, etc. For example, a list item of "@Team1Meet at 2:00 pm to discuss project" may be additionally annotated with a list item attribute of a person's name, such as "Joe," to create a modified list item of "@Team1Meet at Joe's office at 2:00 pm to discuss project." The list authoring surface may then associate the first metadata item of "@Team" with the list item attributes of "2:00 pm" and/or "Joe's office" to generate a task for display in the list user interface 120 of all users who are members of "@Team1.". Association of such metadata items and list item attributes may allow the task to be used more effectively. For example, the resulting task item, may allow the list authoring surface to retrieve information about the members of "Team1," for example, calendaring information to determine whether the members are available at "2:00 pm," and/or the list authoring surface may retrieve contact information to determine the location of "Joe's office." Such information may be automatically added to the list authoring surface 120 as a pivot item out from the resulting task. As should be appreciated, these are only examples of the many ways in which metadata items and other list item attributes may be associated to enhance the effectiveness of task items in the list authoring surface.

Information entered into the list authoring surface UI 120 and tagged or grouped according to one or more metadata types, list item attributes or in association with a natural language processor, as described above, may then be utilized in a variety of helpful ways, including generation and display of resulting tasks. For example, date and/or time annotation or tagging applied to tasks, events, activities or other pieces of information (hereafter referred to as "tasks") may be utilized for manipulating, e.g., editing, sorting, searching, or otherwise manipulating, tasks and related information contained in the list authoring surface according to any applied metadata or list item attributes, e.g., date/time, people, teams, etc. In addition, tasks annotated with a date and/or time metadata may be organized in an events timeline and may be further annotated to help the user accomplish or otherwise handle tasks along a prescribed timeline. As referred to herein, timeline may be broadly defined to include any time representation, including dates, times, calendar information, seasons, years, etc. For example, certain tasks may have hard deadlines, for example, a doctor's appointment on a specific date and time that may not be moved by the user.

Other tasks may require accomplishment or handling during a prescribed date/time range, for example, some time on Friday before 6:00 p.m. According to embodiments of the invention, such date and/or timing information may be applied to tasks entered into the list authoring surface user interface 120 to apply a "fuzziness" to the timing aspect of tasks contained in the user interface. For example, if on a given day two tasks must be accomplished or otherwise handled at very specific times, then those tasks may be annotated with metadata allowing the user to sort, search or otherwise manipulate those items based on the hard dates/times applied. On the other hand, if one or more other tasks must be completed on the same day, but may be completed at any time up to a given end time, for example, 6:00 p.m., then those tasks may be annotated with a metadata type allowing those items to move in the events timeline associated with tasks that must be accomplished or otherwise handled on the prescribed day so long as the times for accomplishing or otherwise handling those items do not go beyond a prescribed outer time limit, for example, 6:00 p.m. For another example, if a user wants to mow his/her lawn in the morning and go to a specific restaurant that evening, the list authoring surface may allow capturing times like "Morning" and "Evening" in the same way that using a paper calendar they may put the mowing activity towards the top of the box for that day and the restaurant name towards the bottom of the box for that day without a specific time for either. According to an embodiment, then, sorting, searching or otherwise manipulating list items contained in the list authoring surface UI 120 may be accomplished on list items having hard date/times, or may be accomplished on list items having soft or fuzzy date/times, or a combination thereof.

The list authoring surface UI 120 may provide reminders to the user to accomplish or otherwise handle tasks contained in the list authoring surface UI 120, and the inclusion of metadata associated with hard dates/times and metadata associated with soft or fuzzy dates/times may be utilized for providing a more realistic experience to the user. For example, a reminder of an upcoming hard date/time, for example, a specific appointment, may be of one variety of reminder and a reminder associated with a soft or fuzzy date/time may be of a different type of reminder that is less urgent in comparison to a reminder associated with a hard date/time. In addition, tasks associated with a soft or fuzzy date/time may be automatically floated through a given day's schedule until a prescribed end point, for example, no later than 6:00 p.m. is approached. Thus, the reminders associated with hard date/time items as compared to soft or fuzzy date/time items may be accomplished in a way that more closely approximates how a user might remind himself or herself of such items by jotting the items down on a scrap of paper, notepad, sticky note, and the like.

As described in further detail below, the list authoring surface user interface 120 may be deployed in association with a multitude of software applications and data associated with different software application types. For example, the list authoring surface may be utilized for receiving information from or capturing information from a variety of electronic files, such as word processing documents, spreadsheet application documents, slide presentation application slides, Internet browser content, social media site content, video applications, audio applications, electronic inking, for example, handwriting electronically with a stylus and electronic writing pad, photographs, electronic mail items, calendar items, task items from other tasks, speech-to-text files, and the like. In addition, information stored for the list authoring surface may be utilized by other applications for enhancing the functionality of the list authoring surface.

Consider the example entered or captured task in the form of the phrase "Meet at Bob's Pizza Parlor at 6:00 p.m. on Friday." Once individual words or phrases in the entry are parsed, recognized, annotated, or otherwise tagged with metadata as described above, those tagged items may be utilized by other applications to enhance the functionality of the list authoring surface. For example, the business name of "Bob's Pizza Parlor" may be passed to a software application for determining a location of Bob's Pizza Parlor. The location of Bob's Pizza Parlor may in turn be passed to a global positioning system (GPS) mechanism of the user's global device, for example, a phone, personal digital assistant, etc., the time associated with the entry of "6:00 p.m. on Friday" may be passed to a calendar function utilized by the user, and any other words or phrases of interest in the phrase may be thus utilized. Now, following with this example, if the user leaves his or her office and is utilizing a mobile device, to which he has deployed the list authoring surface UI 120, as will be described below, as the user approaches the location of the example "Bob's Pizza Parlor" or as the user approaches the designated time of "6:00 p.m. on Friday," or a combination of the two, a reminder may be provided to the user via his mobile device that the time for meeting at "Bob's Pizza Parlor" is approaching, or that the location of "Bob's Pizza Parlor" is approaching, or of a combination of the above. Use of presence data (for example, location of a mobile device as determined by signal strength or GPS positioning) may also be used to relate information or task reminders in the list authoring surface to other pertinent information, such as calendar items, meeting locations, etc. In addition, if the meeting reminder is associated with a particular person or group of persons, the list authoring surface may query a contacts application for contacts information for the person or persons and make that information available through the list authoring surface UI 120.

For another example, if a user enters a task associated with the editing of a particular portion of a given word processing document, metadata associated with an identification of the particular document may be applied to the task entered into the list authoring surface user interface 120. When the user next opens the specified word processing document, a reminder may surface in the list authoring surface UI 120 to remind the user that a particular paragraph in the word processing document should be edited. According to one embodiment, if such a document is not already opened, if the user sees a reminder to edit an identified document, the document may be opened directly from the list authoring surface UI 120 by selecting the document identified in the UI 120.

Referring still to FIG. 2, one or more functionality buttons and controls may be exposed in the user interface 120, in addition to those described above with reference to FIG. 1. A reminder function 210 may allow a user to mark a given task or information item in the UI 120 for setting a desired reminder date/time. A private notification function 215 may allow a user to mark a given task or information item as "private" so that the task or information item is not exposed to other users via their list authoring surface user interfaces. As should be appreciated, the functions 210 and 215 are only examples of the many functions that may be exposed in the list authoring surface UI 120 for applying useful metadata or function to tasks or information items listed in the UI 120.

Figure 3:
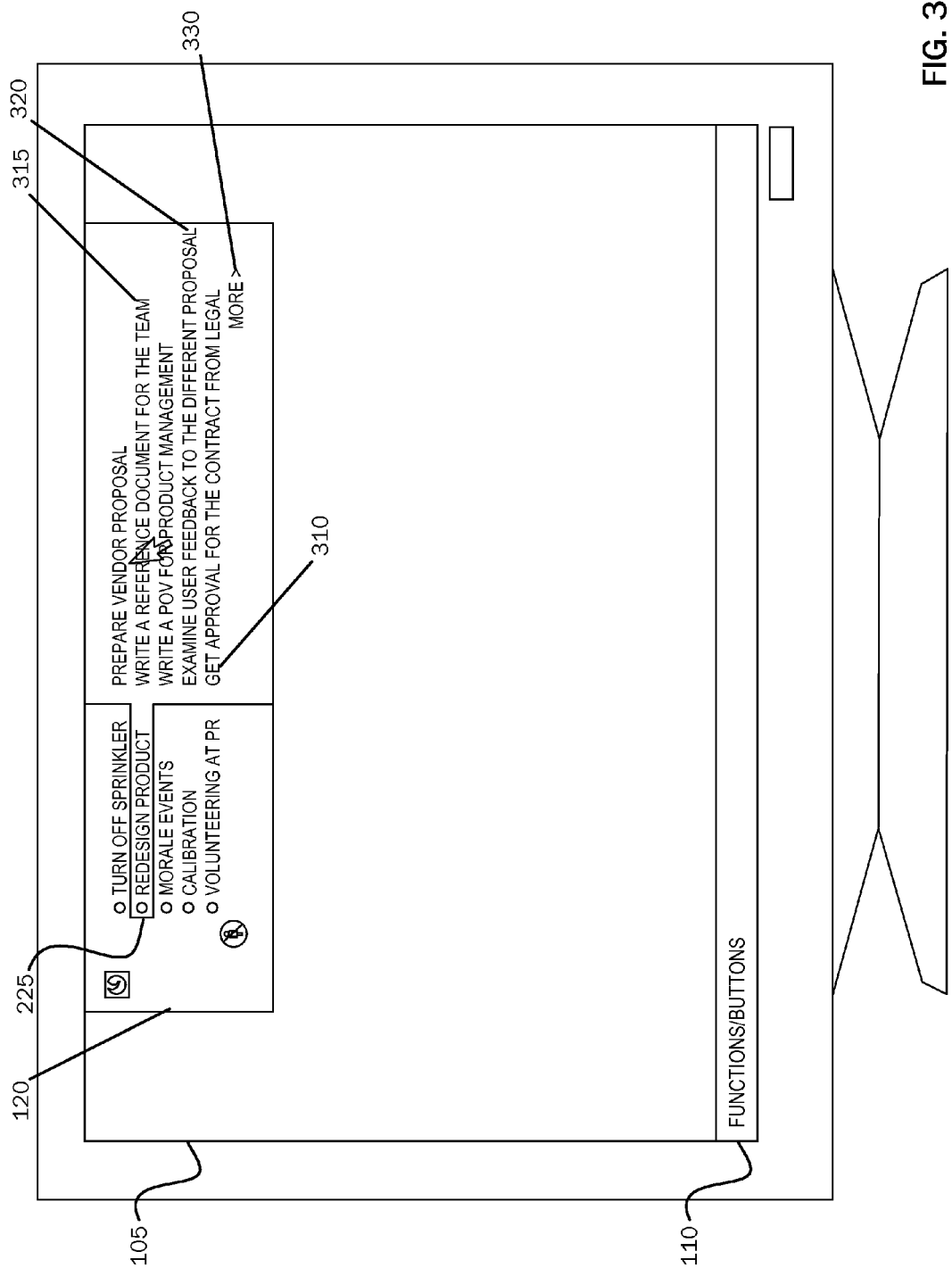
FIG. 3 is a simplified block diagram of the list authoring surface user interface of FIG. 2 showing a list of information pivoting out from a selected task item.

FIG. 3 is a simplified block diagram of the list authoring surface list user interface of FIG. 2 showing a list of information pivoting out from a selected task item. As should be appreciated, for any individual task or other piece of information entered into the list authoring surface, one or more subtasks, sub events, or sub items of information may be entered and associated with any previously entered tasks. For example, referring to FIG. 3 a variety of tasks or other pieces of information 315, 320, have been entered in association with a parent task 225 of "Redesign product." According to an embodiment, selection of the parent task 225 allows for the launching of a pivot table 310 within the list authoring surface user interface 120 for displaying the subtasks 315, 320 associated with the parent task 225. A "More" button 330 is illustrated for allowing a display of additional subtasks 315, 320 under the selected parent subtask 225 if the available size of the user interface 120 only provides for an initial display of a fixed number of tasks, events, activities or other pieces of information. According to one embodiment, a specified maximum number of displayed subtasks, for example five subtasks, may be displayed to keep the user's focus on a "top" number of important tasks. As should be appreciated, subtask information displayed in the pivot table 310 may be filtered, searched, sorted, or otherwise manipulated as is the case with information contained in the main user interface 120.

Figure 4:
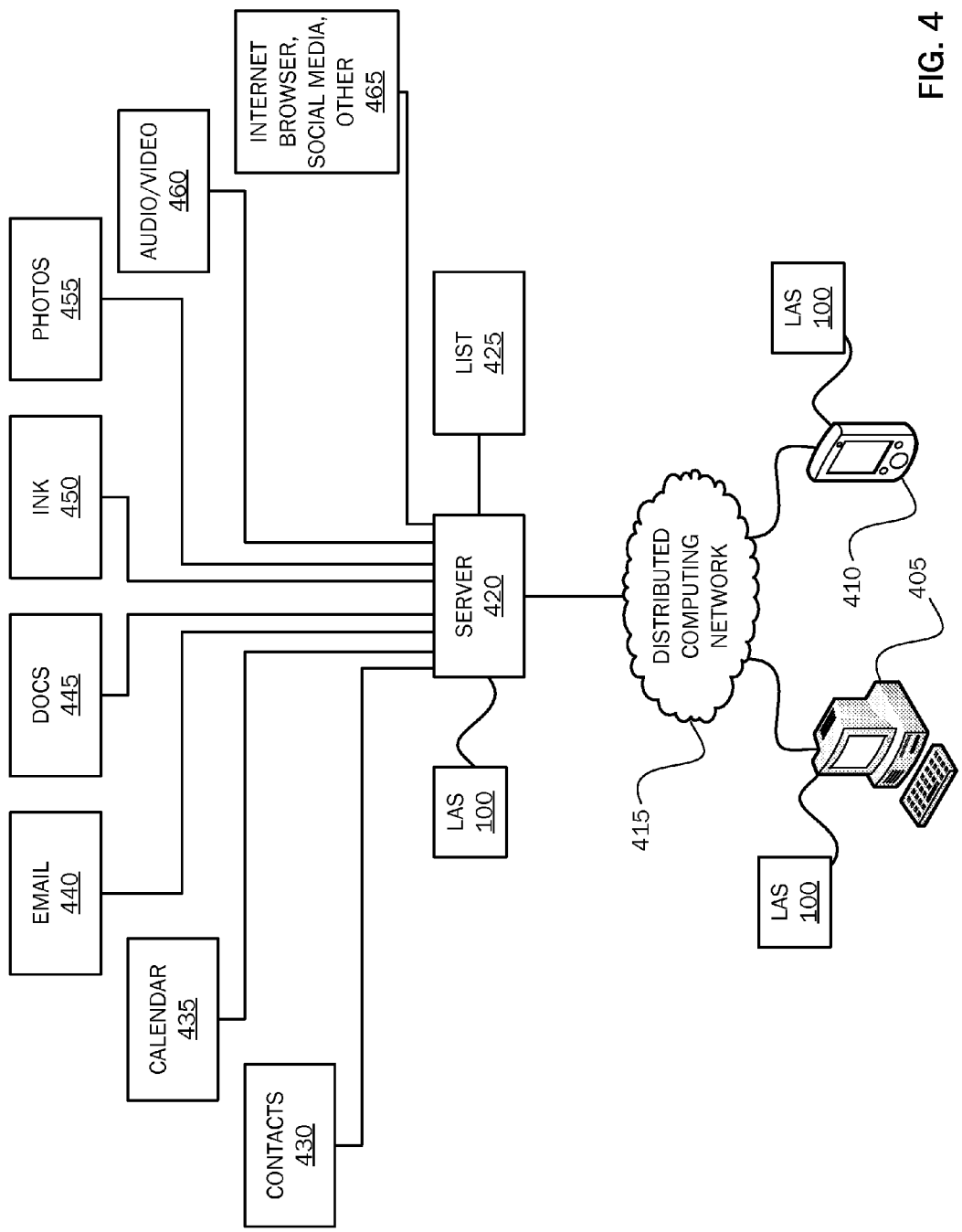
FIG. 4 is a simplified block diagram of a computing architecture in which embodiments of the present invention may be practiced.

FIG. 4 is a simplified block diagram of a computing architecture in which embodiments of the present invention may be practiced. Referring to FIG. 4, the desktop or laptop computer 405 is illustrative of any stationary computing device utilized by a user for entering, capturing or otherwise utilizing data in association with the list authoring surface described herein. The mobile device for 410 is illustrative of a mobile telephone, personal digital assistant, wirelessly connected laptop computer or any other computing device with which a user may utilize the list authoring surface in a mobile environment. The distributed computing network 415 is illustrative of any suitable means for allowing the computing devices 405, 410 to communicate with one or more applications or databases via a remote server 420, for example, the Internet, a corporate intranet, a home-based intranet, and the like.

The server 420 is illustrative of a general purpose computing device operating as a remote server on which the functionality of the list authoring surface may be maintained for allowing the list authoring surface to follow the user from one device 405 to another device 405 to a mobile device 410, or to any other device on which the list authoring surface UI 120 may be deployed for use as described herein. According to an embodiment, all functionality and data storage associated with the list authoring surface and the associated user interface 120 may take the form of a list authoring surface application or module 100 having sufficient computer-executable instructions for performing the functions described herein. The list authoring surface application or module 100 may be resident on a single computing device 405 or 410 for use in association with data accessible by the devices 405 and 410. Alternatively, the functionality and associated data for the list authoring surface and its associated user interface 120 may be maintained and operated at the remote server 420, as illustrated in FIG. 4.

The list 425 is illustrative of a database list or table accessible by the device 405 or 410 locally or via the server 420 where information entered manually or automatically into the list authoring surface and displayed via the associated user interface 420 is maintained. As should be appreciated, if the user is not in a distributed computing environment, the list 425 and associated stored data may be stored or cached on a local computing device 405, 410. That is, according to an embodiment, each instantiation of the list authoring surface may cause the generation of a list table 425 maintained in a database stored locally on the computing device 405, 410 or stored in association with the server 420.

In the list 425, each task, event, activity, or other piece of information may be assigned to and stored in a given line in the list 425. In addition to storing each individual entry, information identifying annotations applied to individual entries, for example, metadata, or other identifying information may be stored in the list 425 with the associated information entry. Moreover, if the information is associated with other data, for example, a document, calendar item, electronic mail entry, or if an entry is associated with other information, for example, global positioning system location data, date/time data, and the like, information identifying such associations may also be stored on a line in the list 425 or linked to a different list 425 with each associated task, event, activity or other piece of information entered manually or automatically into the list authoring surface. As new data is added to the list authoring surface user interface, or as data is changed in the list authoring surface, or as data contained in the list authoring surface is associated with other information, the data stored in list 425 is updated. According to alternative embodiments, the list items 425 and associated data may be stored according to a variety of different means aside from a data base line described above. For example, the list items and associated data may be stored as extensible markup language (XML) representations or similar representations across multiple linked lists, tables and the like that are available to or accessible by the list authoring surface.

Referring still to FIG. 4, a variety of information sources available to the list authoring surface are illustrated. For example, information from a contacts application or database 430 may be utilized for obtaining information for entry into the list authoring surface. Information from a calendaring application 435 and associated data storage may similarly be obtained. As will be described below with reference to FIG. 6, information from an electronic mail application and associated content 440 may be utilized for populating the list authoring surface. Information from a variety of documents 445, for example, word processing documents, slide presentation documents, spreadsheet application documents, and the like may be utilized for population of data into the list authoring surface. An ink application 450 is illustrative of an electronic pen and ink application for allowing data entry, for example, through contact of a stylus with an electronic writing pad. Photos applications/storage 455 is illustrative of any application or data storage through which photographs may be obtained and copied or moved to the list authoring surface. The audio/video application and storage 460 is illustrative of one or more means for obtaining audio or video files, for example, a recording mechanism operated through a digital or analog recording device or camera such as might be available through a mobile telephone and the like. Content for the list authoring surface may also come from Internet browsers, social media sites, or other sources 465. As should be appreciated, data and information from any other available source for electronically moving or copying or otherwise entering data may be utilized for populating the list authoring surface and its associated user interface 120 with tasks, events or other information of interest.

While the various data or information illustrated in FIG. 4 are illustrated in association with the server 420, each of these sources of data and/or information may also be directly associated with and/or stored at local computing devices 405, 410.

In addition, according to embodiments, information from one or more sources to the list authoring surface is not a one-way communication. That is, according to embodiments, the list authoring surface and/or individual task lists or task list items may be linked to the source from which task list items were obtained (e.g., a word processing document), and information from the task list may be pushed back to the source. For example, if a piece of information in the form of a task item is in the LAS UI 120, that information may be pushed back to a source from which it came. As should be appreciated, a variety of mechanisms may be utilized for pushing information back to the source. A path to the source may be associated with each respective task list item. A selection of the task list item may cause exposure in the LAS UI 120 of a selectable button or control for pushing the selected item back to the source and/or for launching the source document.

Figure 5:
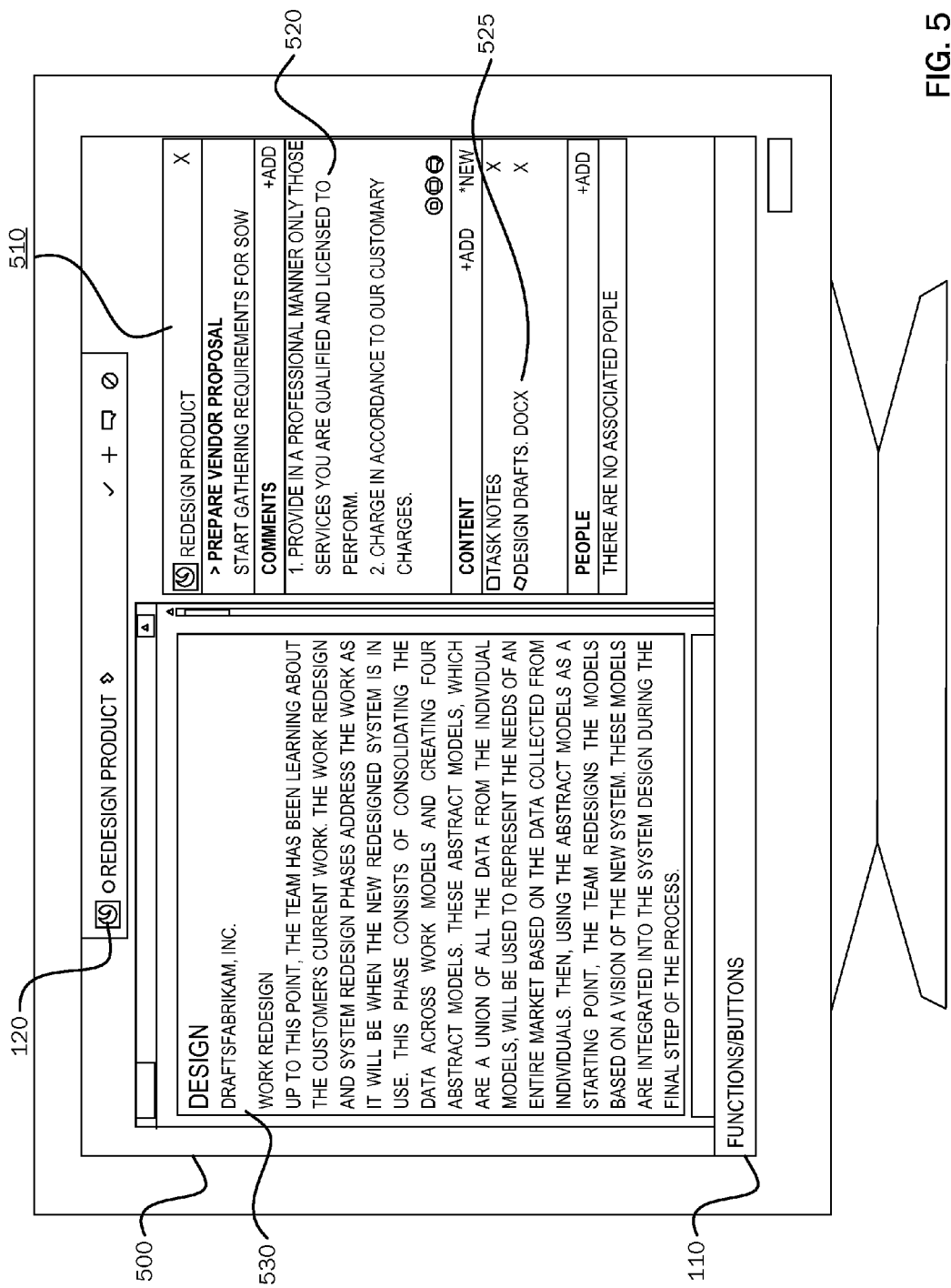
FIG. 5 is a simplified block diagram illustrating a list authoring surface user interface displayed in association with a displayed document.

FIG. 5 is a simplified block diagram illustrating a list authoring surface interface and a list authoring surface information input component in association with a displayed document. As described above, information may be entered into the list authoring surface user interface 120 manually or automatically through information capture as described below. As illustrated in FIG. 5, an example document 530 is illustrated displayed on the computer monitor display screen 500 in association with an example word processing application. According to embodiments of the invention, an expanded version of the list authoring service user interface 120 may be deployed as illustrated and described above with respect to FIGS. 2 and 3 for entering any desired information including information about or associated with a displayed document 530.

According to another embodiment, a list authoring surface information input component 510 may be deployed in association with the list authoring surface user interface 120 for entering and annotating data about a given task or information item in the list authoring surface UI 120. According to the example illustrated in FIG. 5, the list authoring surface information input component 510 has been launched in association with the task "Redesign product" and displayed in the list authoring surface UI 120. The list authoring surface information input component 510 includes a title section for providing data to identify the information being entered in association with a given task, event or other piece of information included in the list authoring surface. For example, the list authoring surface information input component 510, illustrated in FIG. 5, is identified in association with the task of "Prepare vendor proposal" which is a subtask of the parent task "Redesign product." Underneath the title portion of the list authoring surface information input component 510 is a comment section 520 for allowing a user to enter comments which may be additional tasks, events, activities or other information associated with the example subtask. For example, the comments entered in the comments section 520 may be subtasks to the subtask "Prepare vendor proposal," or the comments entered in the comments section 520 may simply be comments to remind the user of various aspects of the associated subtask.

A content section 525 is provided for allowing other content items, for example, documents, audio files, video files, or other content types to be associated with the example task or subtask. A "people" section is illustrated at the bottom of the list authoring surface information input component 510 for associating one or more people, groups of people or teams with the subtask. For example, as was described and illustrated above with respect to FIG. 2, a team grouping that may be utilized in association with a metadata tag of "@Team" may be applied to a given task or subtask. Other groupings or individual persons may similarly be associated with one or more tasks or subtasks entered into the list authoring surface and its associated UI 120. As should be appreciated, the configuration, layout and fields illustrated in the list authoring surface information input component 510 are for purposes of example only and are not limiting of other text, data entry or data annotating fields or sections that may be provided in the list authoring surface information input component 510.

Referring still to FIG. 5, the document 530 displayed on the display screen 500 is illustrative of any document, such as a word processing document, spreadsheet document, slide presentation document, notes document, tasks document, calendaring document, and the like that may be displayed on the display screen 500. As is illustrated in FIG. 5, the document 530 is being processed in some manner by a user, and the user decides to enter information into the list authoring surface via the list authoring surface information input component 510 about the displayed document. For example, as the user is editing the displayed document, the user may remember that one or more tasks should be performed in association with the project referenced in the displayed document. Thus, by launching the list authoring surface user interface 120 and subsequently launching the list authoring surface information input component 510, the user may insert tasks, comments, content items or associate the document or portions of the document or tasks associated with the document with one or more people, groups or teams of people just as the user might handwrite such notes or annotations on a scrap of paper or sticky note to remind the user subsequently to deal with those matters. According to an alternate embodiment, entering tasks or other information into the LAS UI 120 while a document 530 is opened may cause tasks or other information entered into the UI 120 to be automatically associated with the document (i.e., metadata representing the document may be applied to the entered tasks or other information).

As illustrated and described above with reference to FIG. 4, the list authoring surface and its associated user interface 120 may be utilized in a stationary computing system 405, or the list authoring surface may be utilized in association with one or more mobile devices 410. Advantageously, information stored in the list authoring surface in the list 425 in association with the server 420 may be deployed across a variety of applications, as described herein, and may be deployed on a user's mobile device when the user is on the go. Thus, the list authoring surface allows the user to, in effect, carry an electronic version of a "To do" list when the user leaves the desktop operating environment by having the list authoring surface and its associated user interface 120 deployed on his or her mobile computing device, such as a mobile telephone, personal digital assistant, wireless gaming device, and the like.

According to embodiments, the list user interface may be imported to the stationary computing device 405 and to the mobile computing device 410 from the remote server 420. When tasks are displayed in the list user interface, an instantiation of the list user interface may be displayed on the stationary computing device and on the mobile computing device. When changes are made to tasks in the list user interface at the remote server, the changes are passed to the stationary and mobile devices in the form of new instantiations of the list user interface displayed on the stationary computing device and on the mobile computing device. In addition, when changes are made to tasks in the list authoring surface UI 120 at either the stationary or mobile computing devices, such changes may be passed up to the list authoring surface and associated data storage at the remote server 420.

Figure 6:
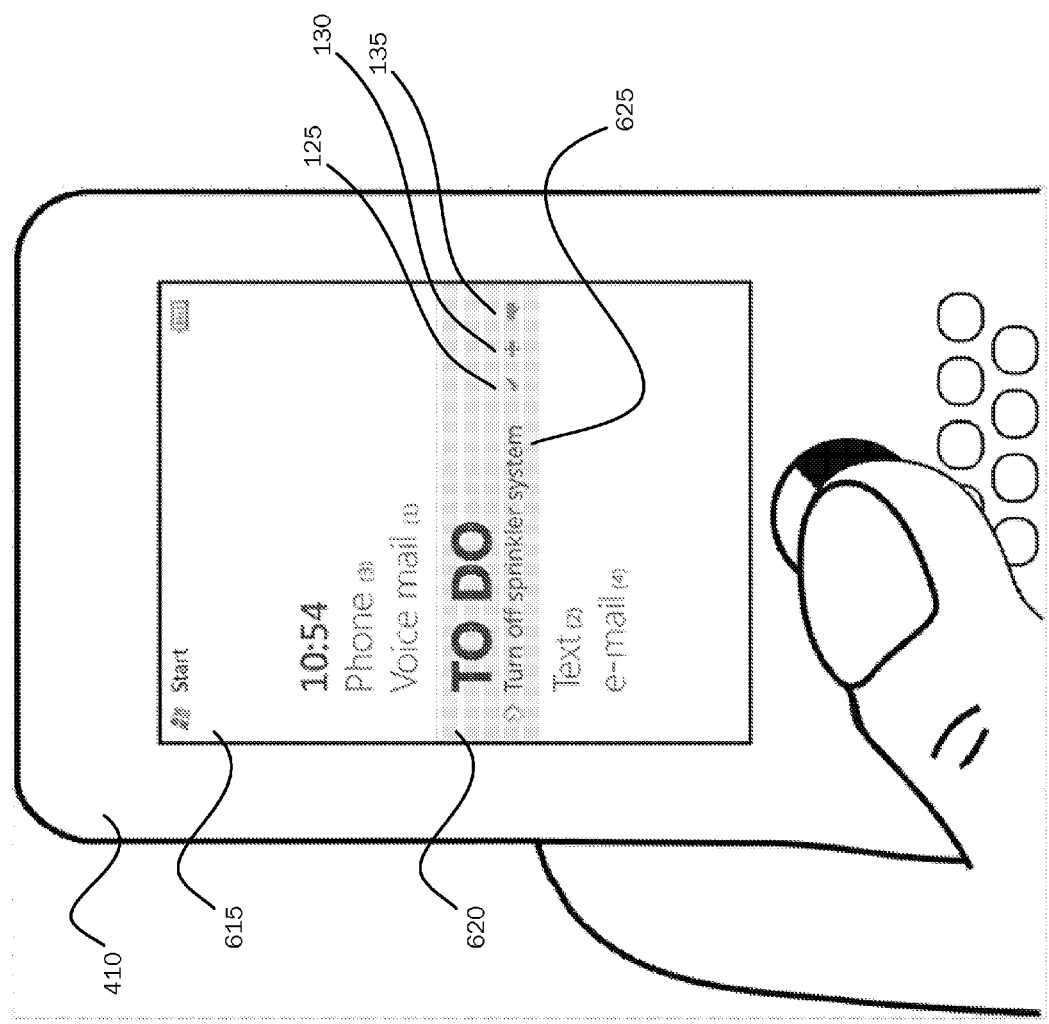
FIG. 6 is a simplified block diagram illustrating a mobile computing device and illustrating a list authoring surface user interface deployed on a display screen of the mobile computing device.
Figure 7:
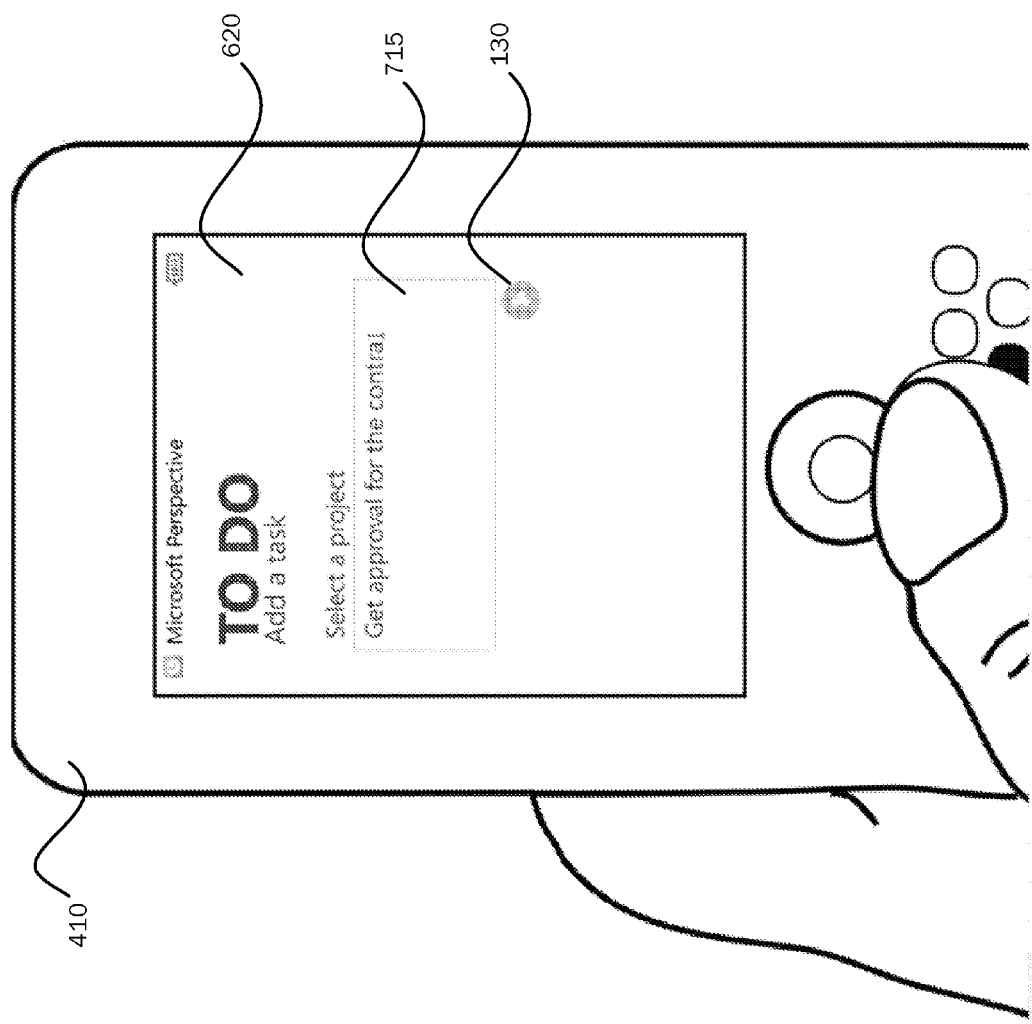
FIG. 7 is a simplified block diagram illustrating a mobile computing device and illustrating a list authoring surface user interface deployed on a display screen of the mobile computing device.

FIGS. 6 and 7 illustrate use of the list authoring surface and its associated user interface in a mobile environment. As illustrated in FIG. 6, the list authoring surface user interface 620 is illustrative of a mobile version of the list authoring surface UI 120, described above, deployed on the display screen 615 of a mobile telephone 410. Just as the user may deploy the list authoring surface user interface 120 on a display screen of his or her computer or laptop, as described above, with reference to FIGS. 1 through 7, so can the user deploy the list authoring surface user interface 620 on his or her mobile device to utilize the same functionality as may be utilized in a stationary computing environment.

Referring to FIG. 7, if the user launches the list authoring surface user interface 620, illustrated in FIG. 6, the "To do" list 625 may be launched on the display screen of the user's mobile device to allow the user to review one or more tasks, events, activities or other information or to allow the user to enter additional information 715, edit existing information, or otherwise manipulate existing information. If the user does edit or otherwise manipulate information contained in the list authoring surface user interface via his or her mobile device, the modified information may be stored at the list 425 via the server 420, and the next time the user deploys the list authoring surface user interface 120 on his or her stationary computing device, those changes or modifications made to information contained therein via the user's mobile device will appear in the user interface 120 deployed with respect to one or more other applications in the user's stationary computing environment.

In addition, the mobile device 410 may be utilized for quick capture of information that may be exported directly to the list authoring surface, as described below. For example, a camera function of a mobile telephone may be utilized for taking a photograph that may be automatically imported to the list authoring surface. For another example, global positioning system (GPS) data from the mobile device 410 may be captured with respect to a particular location or address and may be imported to the list authoring surface.

As briefly described above, according to embodiments, a reminder for a given task contained in the list authoring surface may be generated or triggered based on contextual information extracted from one or more sources of information related to the task. For example, if a task of "pick up flowers after work" is contained in the list authoring surface, and is displayed via the list authoring surface UI 120, a reminder to the user on the user's desktop or mobile computing device may be triggered based on contextual information that may cause the reminder to be generated at a time that is more useful to the user. For example, if the user is in a meeting that delays the user beyond the time that the user normally travels home from work, presence data available through the user's electronic calendaring system and location information, such as from a global positioning satellite (GPS) system, or location information that may be available through the user's mobile telephone or other mobile device may be utilized to develop contextual information for triggering a more timely reminder of the task. As described below, with reference to FIG. 8, other methods for determining presence may be employed. For example, the list authoring surface may be aware of the user's work calendar and when their last meeting is taking place, or the list authoring surface may log the user's behavior over time to know when the user usually leaves work each day, such as when the user logs off a company computing system. Continuing with the above example, then, based on the presence data and location information, a reminder for the task of "pick up flowers after work" may be generated and presented to the user after the user actually leaves work and as the user approaches a given florist. Thus, the timeliness of the reminder as triggered by the context of the associated task makes the reminder more useful than would be the case if the reminder was simply presented at a fixed time, for example, 5:15 p.m. when the user might still be at work in an extended meeting.

Figure 8:
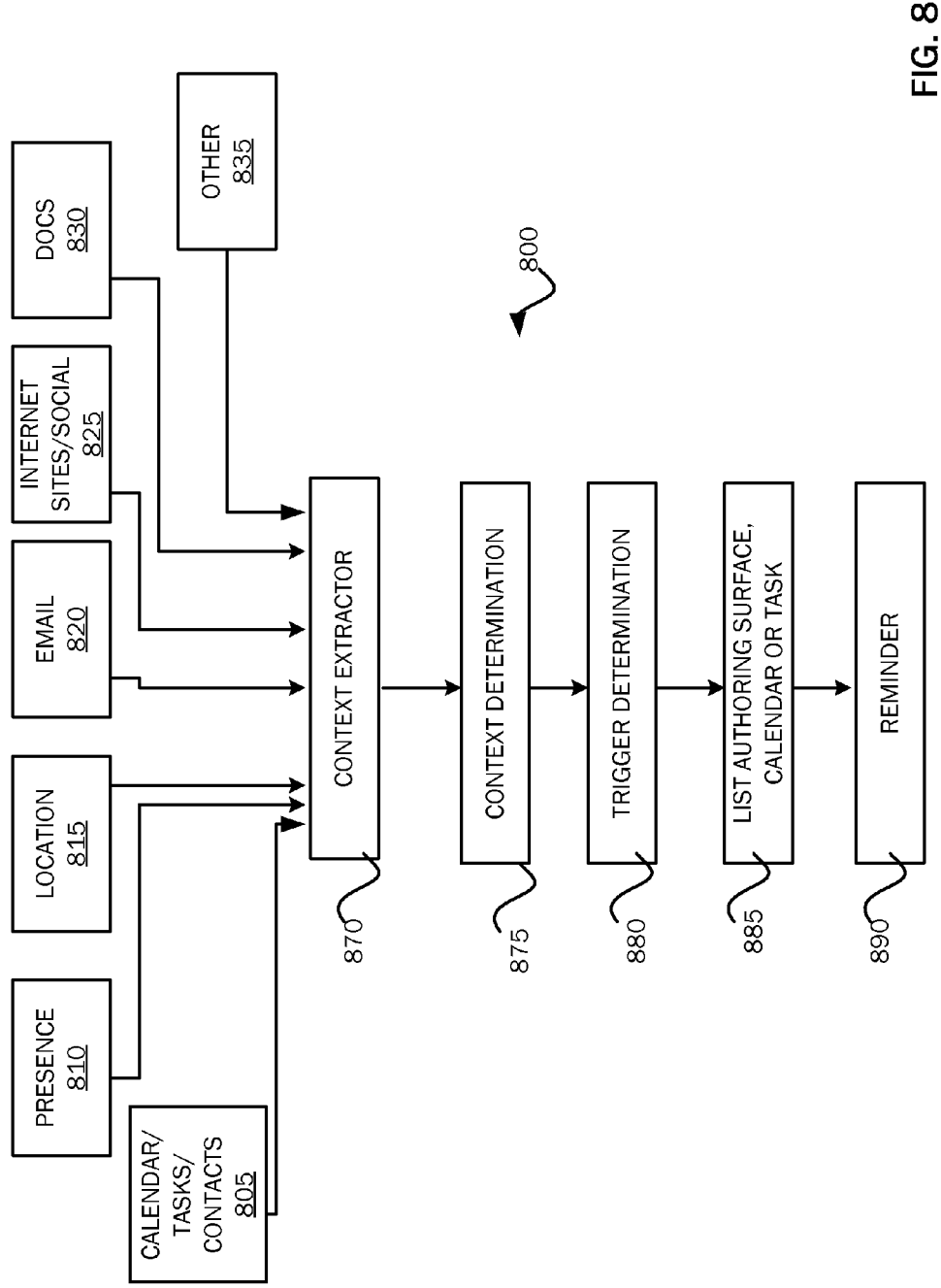
FIG. 8 is a simplified block diagram of a system architecture for providing timely task reminders triggered by contextual information extracted from one or more data sources that are associated with or otherwise related to the given task.

FIG. 8 is a simplified block diagram 800 of a system architecture for providing timely task reminders triggered by contextual information extracted from one or more data sources that are associated with or otherwise related to the given task. Referring to FIG. 8, a variety of contextual information sources 805, 810, 815, 820, 825, 830, 835 are illustrated from which context information associated with the performance of a given task may be obtained for generating or triggering a task reminder. As should be appreciated, in addition to calendar/tasks/contacts data 805, the presence data 810, the location data 815, the email data 820, the Internet/social networking data 825, and the documents data 830 are only examples of vast amounts of data and various data sources from which contextual information may be obtained. Other data 835 may include data from a variety of other sources, as well as, data from one or more data gathering or providing tools. For example, a person proximity data source, such as a GPS-enabled mobile device may provide helpful presence data, a motion detection data source, such as an accelerometer associated with a vehicle or mobile computing device may provide contextual information relevant to a given task, and a light sensing data source that allows for a distinction between daytime and nighttime may provide helpful contextual information relevant to a given task.

A context extractor 870 is a software application or module operative to parse data contained in the one or more context information sources for extracting contextual information that may be utilized for triggering or generating a timely task reminder. According to embodiments, the context extractor module 870 may utilize various methods for recognizing contextual information and for relating the contextual information to a given task. For example, natural language processing may be utilized against information contained in the contextual information sources and for locating information components, such as keywords, phrases, telephone numbers, names, dictionary words or other content in those sources that may have a bearing on the determination as to when a particular task reminder should be generated or triggered. Other methods, for example, information components, such as keywords, phrases, or alpha numeric text recognition may also be used wherein individual words, phrases, numbers, for example, telephone numbers, and the like may be compared against lists or dictionaries of words, phrases, and numbers for recognition. Such determined or recognized information components may then be compared against information components parsed from one or more tasks for determining whether a context-based task reminder may be in order when, for example, an information component of a given data source matches an information component in a given task item. For example, if a task contains the word "Milk," a reminder may be presented to the user of that item the next time the user is at a grocery store (known based on the user's location). For another example, if a task contains the name of a person, a reminder may be presented to the user the next time the user has a meeting where that person identified in the task is on the attendees list, or the next time the user and the identified person share digital communications (e.g., phone call, IM, email).

According to embodiments, the contextual information sources 805, 810, 815, 820, 825, 830, 835 may be registered with the context extraction module 870 by a user. That is, the user may designate those contextual information sources he/she would like to expose to the context extraction module for obtaining contextual information that may be utilized for triggering contextually relevant task reminders. On the other hand, the context extractor module 870 may be programmed to search all data sources on a list of data sources registered with the extractor module 870 for obtaining contextual information for providing timely task reminders. Alternatively, a user may select one or more contextual information sources as a subset of a list of available contextual information sources for use by the context extractor module for generating timely task reminders. For example, a given user may decide that calendar/task/contacts information 805, location information 815, and social networking information 825 are sufficient for providing contextual information in the course of generating timely task reminders.

The context determination module 875 is a software application operative to compare contextual information extracted from the one or more contextual information sources with information contained in the list authoring surface for tasks contained in the list authoring surface for determining whether extracted information is contextually relevant to one or more tasks. The trigger generation module 880 is a software application module operative to trigger a task reminder in association with the contextual information determined for a given task or for modifying an otherwise prescribed reminder date/time based on contextual information associated with a given task. For example, if it is determined based on contextual information that a given task, for example, "pick up flowers after work" should be presented to a user at 5:15 p.m. instead of a previously prescribed reminder time of 5:00 p.m., the trigger generation module 880 may be operative for modifying the reminder time to a new time based on the contextual information associated with the task in question.

The list authoring surface, calendar, or task module 885 is illustrative of a tasks application or module containing or making available tasks for which reminders may be generated or triggered as described herein. As should be appreciated, in addition to the list authoring surface described in accordance with embodiments of the present invention, the triggering of task reminders based on contextual information associated with or otherwise related to a given task may be performed in association with other tasks applications in addition to the list authoring surface described herein.

The reminder module 890 is a software application module operative for providing a task reminder to a user via a variety of communications means at a timing triggered by the contextual information associated with a given task. For example, the reminder module 890 may cause the presentation of a task reminder via an electronic mail message sent to a desktop or remote electronic mail client, via an instant message (IM) sent to a desktop or remote instant messaging client, via a short message service (SMS) message sent to a desktop or remote SMS client, via a voice call to a wired or wireless telephone in the form of an automated reminder call, or via a desktop prompt delivered to a desktop or mobile computing device.

Alternatively, the reminder triggered in association with contextual information associated with a given task may be presented in the form of a filtered view of tasks presented in the user interface 120. That is, the reminder may simply take the form of a reordering of tasks listed in the user interface 120 wherein the task for which the reminder is generated is filtered to the top of the list. For example, if the user is shopping at a grocery store, the user may not need a reminder in the form of a prompt when he/she enters the store, but rather the user may need his/her task listed automatically filtered such that shopping tasks are filtered to the top of the task list or reordered based on the store being entered. As should be appreciated, the methods of transmitting or otherwise communicating triggered task reminders described above are for purposes of example only and are not exhaustive of the various means by which a task reminder may be passed to a user in accordance with embodiments of the present invention.

In addition, as should be appreciated, the modules 870, 875, 880, 885, 890 are illustrated in FIG. 8 as separate software modules for purposes of distinction and illustration. As should be appreciated, each of these modules may operate together as a single software application residing on the desktop computing device 405, the mobile computing device 410, or remotely on the server 420. Alternatively, the software modules illustrated in FIG. 8 may be located in disparate computing devices accessible to each other via a distributed computing network 415.

As described herein, a variety of context-based task reminders may be generated or modified. Another context in which a reminder may be generated or modified includes a reminder based on what tools are available to the user at any given time. For example, when the user is utilizing a phone, he/she may be reminded of a person he/she wanted to call based on a task to call the desired person in the list authoring surface UI 120. For another example, when the user is utilizing an electronic mail application, the user may be reminded of people he/she wanted to email. For another example, when the user is utilizing an Internet browser application, he/she may be reminded of which web articles he/she wanted to read as set out in one or more tasks. For another example, when the user is in a vehicle, he/she may be reminded of the different places he/she wants to go for errands, etc. based on associated tasks and location data or motion detection information. For yet another example, when the user is working on a given document or with a given set of data, the user may be reminded of tasks associated with the document or data. As should be appreciated the foregoing list of "tools" that may be used and for which context with tasks may be determined is for purposes of example and is not limiting of other tools that may associated with one or more tasks as described herein.

Another context in which a reminder may be generated or modified includes a reminder based on when a user is likely to have forgotten a task. For example, if the task is to memorize someone's name or a new vocabulary word, then a reminder may be presented to the user based on a predetermined reminder cycle, such as every 1 day, followed by every 2 days, followed by every 4 days, followed by every 8 days, and so on. As should be appreciated, such a memory training mechanism may be particularly helpful for users desiring to develop a new habit, such as a physical fitness regimen or a study regimen, or the like. Such a reminder system also may be helpful for a task that need not be performed on an urgent basis, but may be performed at an unspecified time in the future.

For purposes of illustration, consider the following example operations of the task reminder triggering embodiments described herein. Consider a first example in which a user has previously entered a task into the list authoring surface of "Contact members of Team 1 to discuss the sales forecast figures after June 30." According to embodiments, the context extractor module 870 may parse information contained in the various contextual information sources described above. In the course of extracting information from the various contextual information sources, the context extractor module 870 may locate the sales figures document 830 and associate identifying information for the sales figure document 830 with the task in question. That is, the context determination module 875 may determine that the located document 830 is contextually relevant to the task in question, and a determination may be made that a task reminder should be triggered the next time the document in question is opened. The list authoring surface or other calendaring or tasks module may then generate a reminder for the task in question the next time the sales figure document 830 is opened. Thus, the next time the user opens the particular document, a reminder of the task in question may be generated and presented to the user to remind the user that the user wants to discuss this document with Team 1.

Consider as another example that a user of the list authoring surface has entered a task of "Go to office supply warehouse to obtain printer ink." Consider that an identification of the office supply warehouse is listed in a calendar item in the calendar data 805. According to an embodiment, the context extractor may extract the information from the electronic mail received by the user's supervisor, extract an identification of the particular office supply warehouse, utilize the location of the office supply warehouse to obtain location data from the location source (for example, GPS system) 815, and the context determination module 875 may then determine that a reminder for the task should be triggered for the task when the user is approaching the location of the office supply warehouse. In addition, presence data from the presence data source 810, for example, from a mobile telephone's presence in a given wireless communications zone, may be utilized for triggering the reminder when the user enters the immediate area of the office supply warehouse. As should be appreciated from the foregoing, the context extractor module 870 and the context determination module 875 may obtain contextual information from one contextual information source, or from a combination of contextual information sources for assisting in the generation of a task reminder that is timely based on the operating context of the user.

Figure 9:
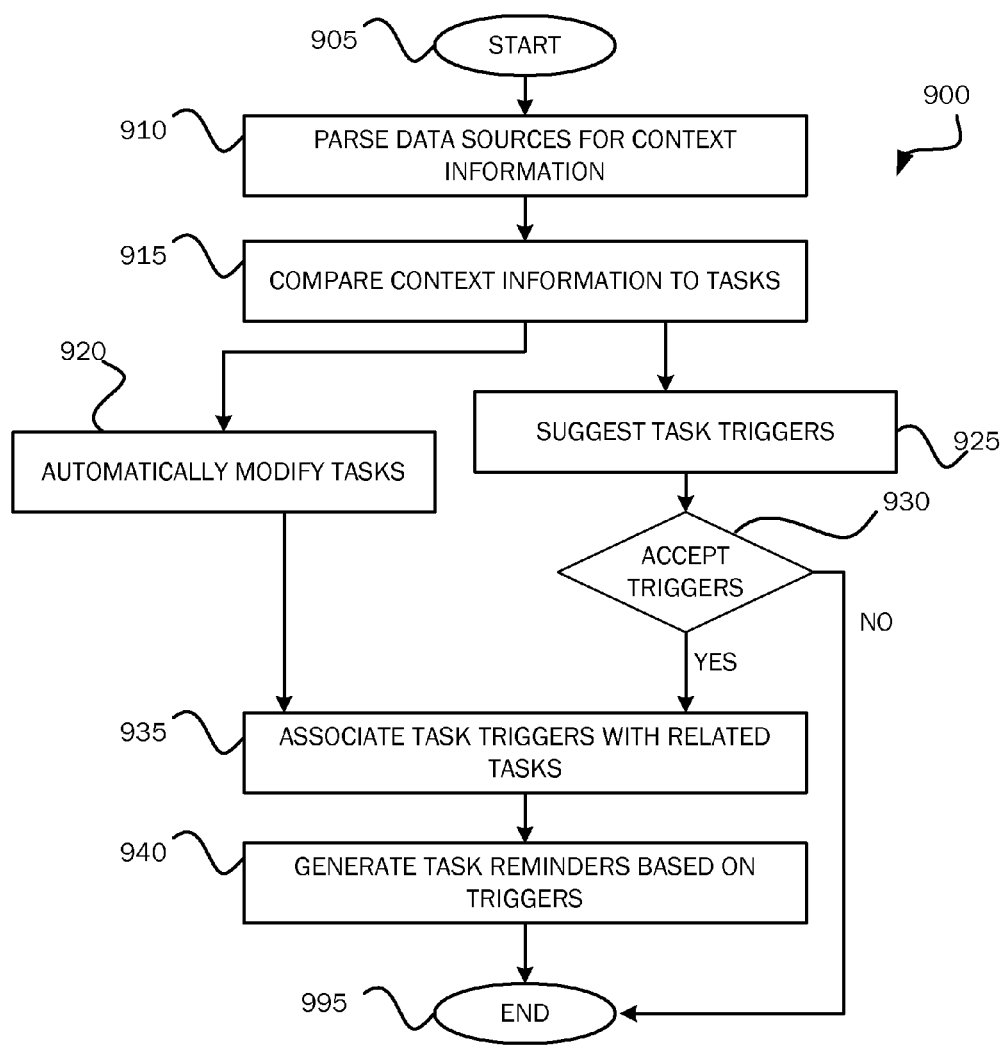
FIG. 9 is a flowchart illustrating a method for triggering a timely task reminder based on contextual information associated with or otherwise related to a given task.

Having described features and operating environments of/for embodiments of the invention, FIG. 9 is a flowchart illustrating a method for triggering a timely task reminder based on contextual information associated with or otherwise related to a given task. The method 900 begins at start operation 905 and proceeds to operation 910 where the context extractor module 870 parses data from one or more contextual information sources for contextual information associated with or related to tasks contained in the list authoring surface or contained in any other calendaring or tasks application designated for application of the task reminder triggering mechanism described herein.

At operation 915, the contextual information obtained from the context extractor module 870 is compared to one or more tasks to determine whether the contextual information is relevant to the one or more tasks and to determine whether a task reminder should be generated for a particular day/time or to determine whether a presently prescribed reminder date/time for a given task should be modified in view of the contextual information obtained for the given task. According to one embodiment, if the contextual information gathered for a particular task indicates that a task reminder should be triggered at a particular date/time or that a prescribed reminder date/time should be modified, the trigger generation module 880 may automatically trigger the task reminder or modify a previously prescribed task reminder at operation 920.

Alternatively, at operation 925, a suggested task reminder date/time may be provided to the user to allow the user to accept or reject the suggested task reminder date/time or to accept or reject a modification of a previously prescribed task reminder date/time. If the user rejects a suggested task reminder date/time, then the method ends at operation 995, and the previously prescribed task reminder date/time for the particular task remains unchanged. If the new or modified task reminder is automatically generated at operation 920, or if the user accepts a suggested new or modified task reminder date/time at operation 930, the method proceeds to operation 935, and the new or modified task reminder date/time is associated with the task, as described above. At operation 940, the task reminder is generated and is presented to the user according to the new or modified task reminder schedule. The method ends at operation 995.

Figure 10:
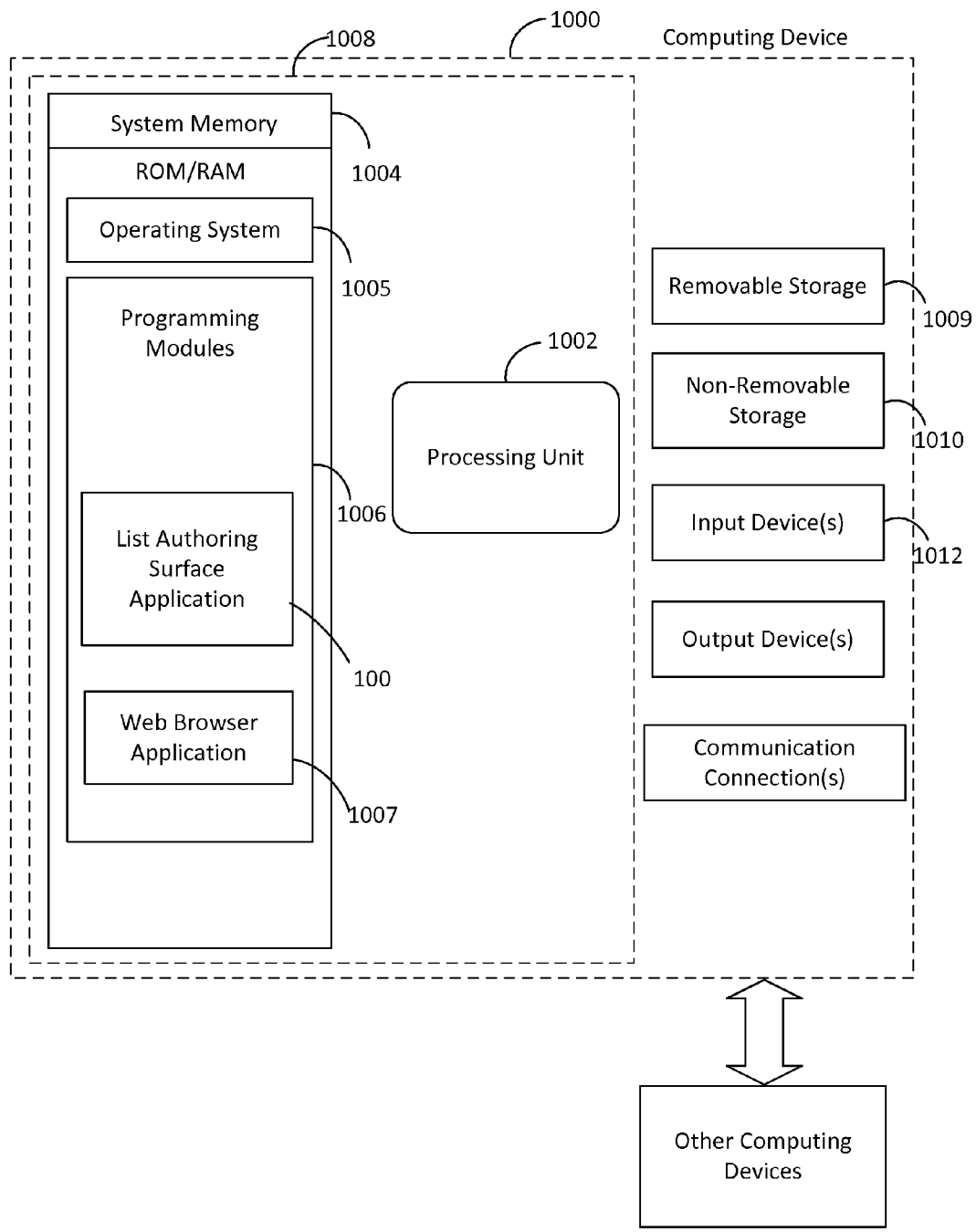
FIG. 10 is a simplified block diagram of a computing system in which embodiments of the invention may be practiced.

Having described embodiments of the present invention and an example logical flow illustrating a method for providing contextually relevant task reminders, FIG. 10 is a block diagram illustrating example physical components of a computing device 1000 with which embodiments of the invention may be practiced. The computing device components described below may be suitable for the computing devices described above, for example, the computing devices 405, 410 and the server and database systems 420, 425. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a web browser application 1007. Operating system 1005, for example, may be suitable for controlling computing device 1000—s operation.

Furthermore, embodiments of the invention may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

As stated above, a number of program modules and data files may be stored in system memory 1004, including operating system 1005. While executing on processing unit 1002, programming modules 1006, such as the list authoring surface application or module 100 described above with respect to FIG. 1 and the web browser application 1007 may perform processes including, for example, one or more method 1000's stages as described above. The aforementioned process is an example, and processing unit 1002 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing context-based task reminders, comprising:

receiving a task item associated with a first reminder;

receiving one or more context information data sources, wherein receiving one or more context information data sources includes receiving one or more context information data sources from one of a calendar data source, a contacts data source, a tasks data source, a presence data source, a location data source, an email data source, an Internet content data source, a social networking content data source, one or more electronic documents, a person proximity data source, a motion detection data source, a communications data source and a light sensing data source;

parsing the task item for one or more task item information components;

parsing the one or more context information data sources for determining information relevant to the received task item, including parsing content contained in the one or more context information data sources for one or more data sources information components;

comparing the one or more data sources information components with the one or more task item information components to determine if the one or more data sources information components matches the one or more task item information components;

if the one or more data sources information components matches the one or more task item information components, then determining the information relevant to the received task item including determining the data sources containing the one or more data sources information components matching the one or more task item information components that are relevant to the received task item;

determining a revised reminder for the task item based on the information relevant to the received task item; and displaying the revised reminder for the task item based on the information relevant to the received task item.

2. The method of claim 1,
wherein receiving the task item associated with the first reminder includes receiving the task item from a repository of tasks, wherein the first reminder for the received task item is set to occur at a first time; and
wherein determining the revised reminder for the task item based on the information relevant to the received task item includes setting the revised reminder to occur at a second time based on the information relevant to the received task item.

3. The method of claim 1, wherein displaying the revised reminder for the task item based on the information relevant to the received task item includes filtering and reordering a display of the task item relative to other displayed task items based on the information relevant to the received task item.

4. The method of claim 1, wherein determining the revised reminder for the task item based on the information relevant to the received task includes determining the revised reminder for the task item based a computing tool in use when receiving the task item associated with the first reminder.

5. The method of claim 1, wherein determining the revised reminder for the task item based on the information relevant to the received task includes determining the revised reminder for the task item based on a predetermined reminder cycle.

6. The method of claim 1, wherein receiving one or more context information data sources includes presence data available through an electronic calendaring system or location information of a mobile device.

7. The method of claim 1, wherein receiving one or more context information data sources includes presence data available through location information of a mobile device.

8. The method of claim 1, wherein the task item is associated with a context information data source for trigger the first reminder for the task item based upon the context information data source.

9. A computer readable storage medium containing computer executable instructions which when executed by a computer perform a method for method for providing context-based task reminders, the method comprising:
receiving a context information source associated with a task, the task being associated with a first reminder time for performance of the task, wherein the context information source including one of a calendar data source, a contacts data source, a tasks data source, a presence data source, a location data source, an email data source, an Internet content data source, a social networking content data source, one or more electronic documents, a person proximity data source, a motion detection data source, a communications data source and a light sensing data source;
parsing content contained in the task for one or more task keywords;
parsing the context information source for determining information relevant to the task, parsing content contained in the context information source for one or more context information source keywords;
comparing the one or more context information source keywords with the one or more task keywords to determine if one or more context information source keywords matches one or more task keywords;
if the one or more context information source keywords matches one or more task keywords, then the context information source is relevant to the task for determining whether the first reminder time should be revised, determining from the context information source that the first reminder should be revised to a second reminder time for performance of the task; and
triggering a presentation of a revised reminder at the second reminder time based on the determination that the first reminder should be revised to the second reminder time.

10. The computer readable storage medium of claim 9, further comprising in response to triggering the presentation of the revised reminder, displaying the revised reminder for the task at the second reminder time.

11. The computer readable storage medium of claim 10, wherein receiving an opening of a context source includes receiving an opening of one of a calendar item, a contacts item, a tasks item, a presence data item, a location data item, an email item, an Internet site, a social networking site and an electronic document.

12. The computer readable storage medium of claim 9, wherein receiving the context information source associated with the task includes receiving an opening of a context source.

13. The computer readable storage medium of claim 9, wherein receiving one or more context information data sources includes presence data available through an electronic calendaring system or location information of a mobile device.

14. The computer readable storage medium of claim 9, wherein receiving one or more context information data sources includes presence data available through location information of a mobile device.

15. The computer readable storage medium of claim 9, wherein the task item is associated with a context information data source for trigger the first reminder for the task item based upon the context information data source.

16. A system for providing context-based task reminders, comprising:
a processor;
a memory; and
a list authoring surface operative
to receive a task item associated with a first reminder, and
to parse content contained in the task for one or more task keywords;
a context extractor operative
to receive one or more context information data sources, the one or more context information data sources including one or more of a calendar data source, a contacts data source, a tasks data source, a presence data source, a location data source, an email data source, an Internet content data source, a social networking content data source, one or more electronic documents, a person proximity data source, a motion detection data source, a communications data source and a light sensing data source;
to parse the one or more context information data sources for determining information relevant to the received task item, including parsing content contained in the one or more context information data sources for one or more context information source keywords;
a context determination module operative
to compare the one or more context information source keywords with the one or more task keywords to determine if one or more context information source keywords matches one or more task keywords;

if the one or more context information source keywords matches one or more task keywords, then context information source is relevant to the task for determining whether a first reminder time should be revised, to determine a revised reminder for the task item based on the information relevant to the received task item; and the list authoring surface being further operative
to display the revised reminder for the task item based on the information relevant to the revised task item.

17. The system of claim 16, further comprising a reminder triggering module operative to set the revised reminder to occur at a second time based on the information relevant to the received task item.

18. The system of claim 17, wherein the reminder triggering module is further operative to trigger the list authoring surface to display the revised reminder at the second time based on the information relevant to the received task item.

* * * * *

UNITED STATES PATENT AND TRADEMARK OFFICE
CERTIFICATE OF CORRECTION

| | | |
|---|---|---|
| PATENT NO. | : 8,375,320 B2 | Page 1 of 1 |
| APPLICATION NO. | : 12/820914 | |
| DATED | : February 12, 2013 | |
| INVENTOR(S) | : Matthew J. Kotler et al. | |

It is certified that error appears in the above-identified patent and that said Letters Patent is hereby corrected as shown below:

In the Claims

In column 21, line 40, in claim 9, after "a method for" delete "method for".

Signed and Sealed this
Seventeenth Day of February, 2015

Michelle K. Lee
*Deputy Director of the United States Patent and Trademark Office*